June 11, 1935. E. G. JOHANSSON 2,004,329
SWITCH FOR ELECTRIC METERS
Filed Sept. 26, 1931   2 Sheets-Sheet 2
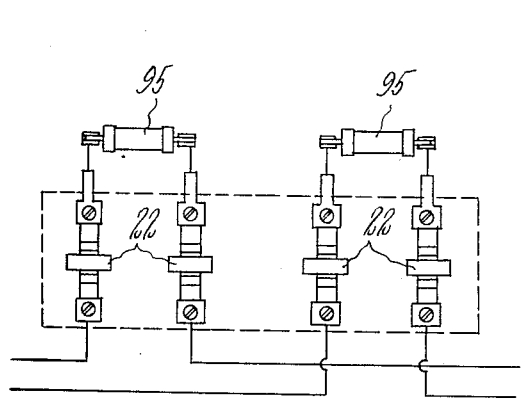
Fig. 11.
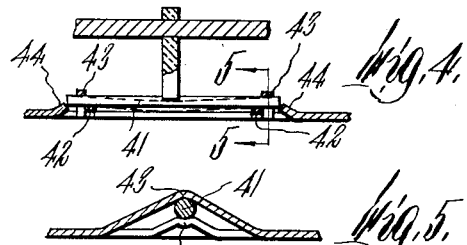
Fig. 4.
Fig. 5.
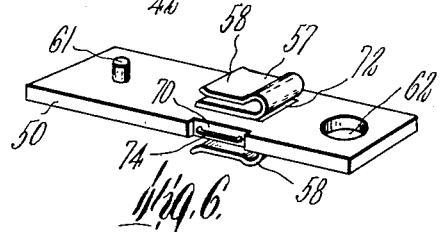
Fig. 6.
Fig. 7.
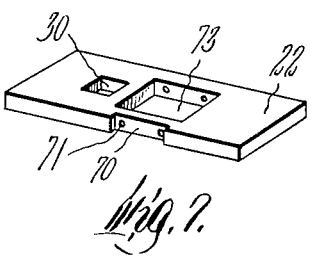
Fig. 8.
Fig. 9.
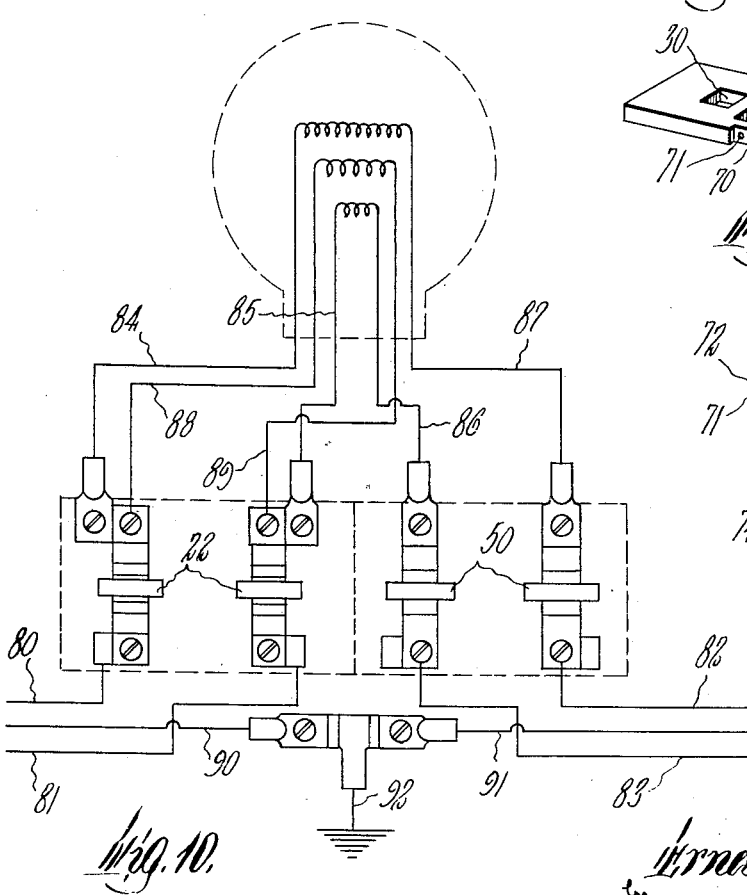
Fig. 10.
Inventor
Ernest G. Johansson
by Wright, Brown, Quinby & May
attys.

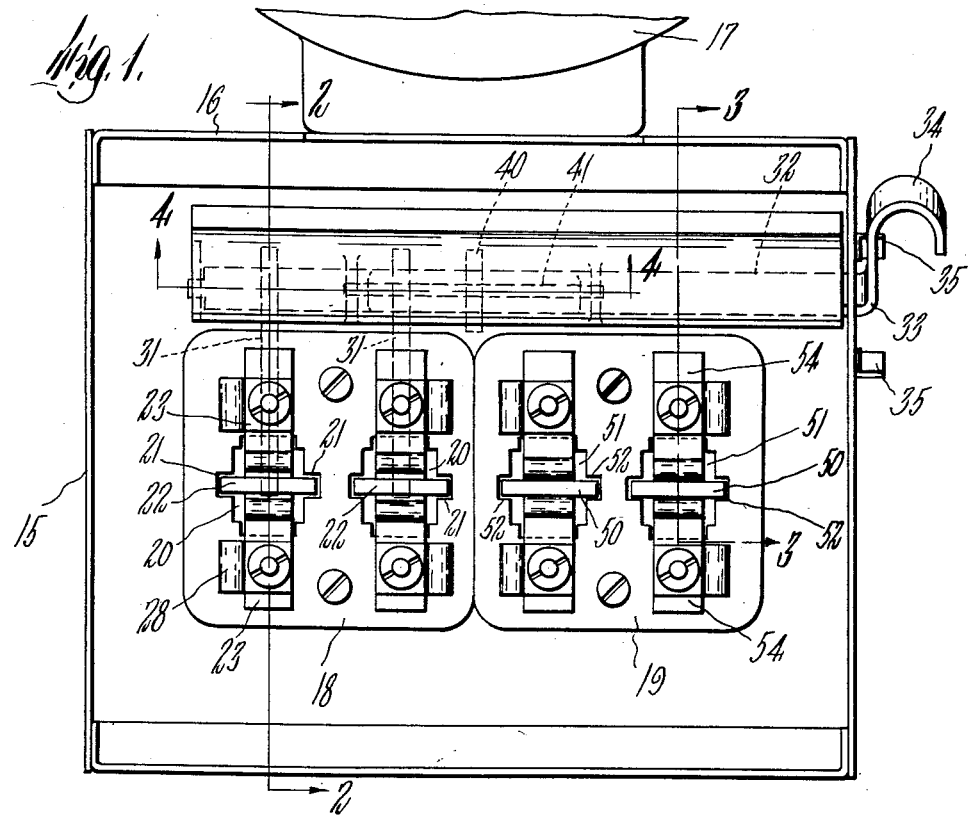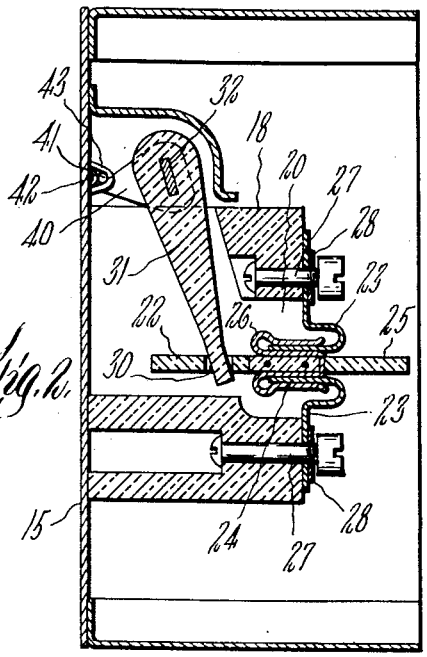

Patented June 11, 1935

2,004,329

UNITED STATES PATENT OFFICE 2,004,329

SWITCH FOR ELECTRIC METERS

Ernest G. Johansson, Watertown, Mass., assignor to The Palmer Electric & Manufacturing Co., Waltham, Mass., a corporation of Massachusetts Application September 26, 1931, Serial No. 565,224

13 Claims. (Cl. 200—16)

This invention relates to electrical switches, and more particularly a switch adapted for use with a meter on a three-wire system, or may be combined with fuses so that both ends of each fuse is dead when the switch is open. One of the embodiments of the invention hereinafter described and illustrated on the drawings is characterized by compactness of structure and ability to carry and rupture heavy currents without excessive arcing. It is furthermore characterized by a pair of switch units for connecting a line with the meter, and another pair of switch units for connecting the meter with the load. The line switch units are operable from outside the box when the box is closed, a suitable operating shaft and handle being provided for this purpose. The load switch units are inaccessible when the box is closed and are manually operable only when the box has been opened. The load switch units each include a movable element of insulating material which moves outwardly to open switch position so that a portion thereof projects across the plane normally connected by the box cover when closed. Thus if the box cover is swung shut either or both of the load switch units are open, the box cover will engage the movable elements and move them to close the load switch units.

An important feature of the invention is the provision of self-aligning contact elements mounted on arc-quenching barriers of non-conducting material which may be subject to slight warping. Due to the possibility of warping, it is desirable that the barriers be loosely mounted, the self-aligning contact elements functioning to make good electrical contacts with fixed elements on either side of the barrier in spite of warping and loose mounting of the barriers which carry them. For this purpose, the interengaging contact elements on each side of the barrier comprise a resilient clamp and a flat member arranged to enter the clamp and to be resiliently pressed thereby on both its faces when the switch is closed.

According to the invention, moreover, the movable switch elements are constructed by a novel method by which the elements are quickly and economically assembled and the bridging conductors which form a part of the movable elements are accurately shaped. Other advantageous features will be apparent to one skilled in the art from the description of an embodiment of the invention which follows and from the drawings of which,—

Figure 1 is an elevation of a structure embodying the invention, the box cover being removed to show the arrangement of switch units therein.

Figure 2 is a section on the line 2—2 of Figure 1.

Figure 3 is a fragmentary section on the line 3—3 of Figure 1.

Figure 4 is a section on the line 4—4 of Figure 1.

Figure 5 is a section on the line 5—5 of Figure 4.

Figure 6 is a perspective view of the movable member of one of the load switch units.

Figures 7, 8 and 9 show parts which, when assembled, constitute a movable member of one of the line switch units.

Figure 10 is a wiring diagram for the switch in connection with a meter.

Figure 11 is a diagram of the switch wired for use as a fused service switch.

The invention may be embodied, as illustrated, in a suitable box 15 of conventional material such as sheet iron, a cover (not shown) being hinged thereto in the usual manner. The upper wall 16 of the box may be provided with a removable plate having an opening suitable to receive the terminal chamber of a meter 17. Within the box 15 and preferably secured to the rear wall thereof is a base of insulating material for the support of one or more switch units. As shown, this base is composed of a pair of blocks 18 and 19, each block holding a pair of switch units. In the embodiment illustrated, the block 18 supports the line switch units, the block 19 supporting the load switch units. As hereinafter described, the switch elements carried by the block 18 differ somewhat from those carried by the block 19. While one block of each type is shown and described, I do not limit myself to any particular number of switch elements of either kind assembled in a switch box. The block 18 is pierced with a pair of suitable holes 20, each hole having a pair of lateral grooves 21 acting as guides for a sliding plate or barrier 22 of insulating material. On either side of the plate 22 is a fixed switch element 23, each of these elements having at its free end a contact portion 24 projecting downwardly into the hole 20 and arranged substantially parallel to the faces of the plate 22. The plate 22 is provided with a blank portion 25 which is movable into the position between the contact portions 24 of the fixed switch elements, thus serving as a barrier to prevent arcing from one fixed element to the other. The plate 22 also carries a bridging conductor 26 which, as shown, extends through the plate and has portions on either side of the plate to engage respective contact elements 23 when the switch is closed. According to the invention, the structure carried by the plate 22 not only engages the contact elements 23 electrically when the switch is closed, but also presses against or resiliently clamps both faces of each element 23 so that the switch contacts are self-aligning and the contacting surfaces are firmly pressed together over broad areas. The bridging conductor may have a shape approximating a W, a U-shaped portion of the bridging conductor lying against each broad face of the plate or barrier 22. The legs of each of these U-shaped portions of the bridging conductor are for most of their length parallel to each other and spaced to receive between them the contact portion 24 of the adjacent fixed switch elements. As the bridging conductor is preferably made of hard copper bar stock, this material has a certain amount of resilience so that the U-shaped portions of the conductor, which are preferably shaped in such a manner that the legs of the U are closer to each other than the thickness of the stock, are sprung slightly when engaged by the contacting portion 24 of the adjacent fixed switch elements. This ensures a firm interengagement between the contacting faces of the bridging conductor and the fixed switch elements. The firm engagement of two faces of each of the contact portions of the switch elements is for the purpose of increasing the effective area of contact between their faces to reduce their interfacial electrical resistance so that there is less likelihood of heating at these contact points. When the switch is opened to break a circuit in which a considerable current is flowing, a certain amount of arcing is unavoidable. In the course of time, portions of the surface of the barrier 22 are charred or carbonized by the heat of repeated arcs. If the charred areas lose their non-conducting efficiency, the arc-quenching function of the barrier is impaired. Hence it is important to make the barriers 22 of material which has negligible non-conducting qualities even when charred. For this reason, I prefer to make the barriers 22 of vulcanized fiber. This material, while satisfactory in the respect cited, is liable to warp to some extent, tending to throw the contact elements of the switch out of alignment as barriers made of such material are preferably loosely mounted in their supporting guides. The self-aligning characteristic of the contact element or bridging conductor 26, however, overcomes this deficiency and ensures alignment and good contact with the contact elements 23 in spite of that warping on the part of the barrier, which experience indicates is to be expected. The fixed elements 23 are preferably made of copper bar stock bent to shape, the grain of the metal running longitudinally along the contacting portion 24, in the direction of motion of the bridging conductor. As the bridging conductor is preferably formed of similar material, the grain of the metal in this member will likewise run in the direction of motion of the member so that the rubbing between the contacting faces of the fixed elements and the bridging conductor will be in all cases along the grain of the metal. This greatly prolongs the life of the switch elements by materially reducing the rate of wear thereon in comparison with elements which rub across the grain of the metal. Each of the fixed switch elements 23 is secured to the block 18 as by suitable bolts 27 which also secure terminal elements 28 for connecting wires.

For the actuation of the movable switch members 22, each of these members may be perforated as at 30 laterally of the bridging conductor 26 to receive the end of an arm 31 preferably of insulating material which is mounted on a shaft 32 extending across the box 15 and suitably journaled therein. As shown, the shaft 32 may be made of a piece of flat bar stock of steel or other suitable material, the arm 31 having a suitable slot therethrough to receive the shaft 32. Thus when the shaft is rotated, the arms 31 slide and move their respective switch members 22 to open or close the line switch units. The shaft 32 is provided with a suitable operating handle outside of the box. To this end, a shaft may be bent at a point outside the box to form a crank arm 33 having an operating handle 34 at the end thereof. Suitable stops 35 may be mounted on the box to limit the throw of the crank 33.

In order to minimize the arcing when the line switches are opened while carrying a load, I may provide a snap action for quick motion of the movable members 22 at the point where their bridging conductors 26 leave contact with the fixed elements 23. To this end, a heart-shaped member 40 is mounted on the shaft 32, this member having a slot shaped to receive the shaft so that it swings when the shaft is rocked. The member 40 projects rearwardly toward the rear wall of the box 15 and tapers to a rounded point as indicated at Figure 2. In the normal path of this rounded end portion of the member 40 is loosely mounted a hardened steel pin 41, this pin being spaced from the adjacent wall of the box as by a pair of lugs 42 which may be struck from the box wall. A pair of adjacent lugs 43 may also be struck from the wall to receive and hold the pin 41 but to permit rotation of the pin therein. A pair of lugs 44 may be struck up from the wall of the box to limit axial movement of the pin without interfering with the rotation of the pin. When the shaft 32 is rocked, the lower end portion of the member 40 engages the pin 41 and rides over it when either the pin 41 or the shaft 32, or both, yield resiliently from each other. Since both the pin and the shaft are stiff, this yielding is against a strong restoring force so that when the tip of the member 40 has passed the pin 44, the restoring force causes one of the tapering side edges of the member 40 to ride on the side of the pin 41 in such a manner as to rock the shaft 32 through a small angle with exceedingly quick motion. This motion is transmitted to the arms 32 which thereupon snap the movable switch members 22 in one direction or the other to close or open the line switch units by very quick movement. This quick switch opening movement helps materially to quench any arcing which may occur in the rupturing of a circuit carrying a heavy current.

In the embodiment of the invention illustrated in Figure 1, the block 19 carries a pair of load switch units, each of which includes a movable member 50 adapted to slide in a hole 51 extending through the block 19. The sides of the hole 51 may be grooved as at 52 to guide the member 50. On either side of the member 50 a fixed switch element 54 is mounted on the box, these elements being preferably made by bending copper bar stock to shape. Each of these fixed elements is preferably shaped with a portion 55 extending into the hole 51 and terminating in an outwardly extending contact portion 56. The movable member 50 is preferably a plate of insulating material, such as vulcanized fiber, which carries a bridging conductor extending therethrough with portions on either side of the plate arranged to engage the free end portions 56 of the respective fixed switch elements 54. The structure carried by the plate also presses resiliently on both sides of the free contact portions 56 when the switch is closed so that the switch contacts are self-aligning and interengage firmly over broad areas in spite of chance warping of the plate 50. For this purpose, the plate may carry a bridging conductor in the form of a W, with a U-shaped portion 58 on either side of the plate 50. The legs of each of the U-shaped portions 58 are preferably parallel to each other and are spaced to receive the adjacent contact portion 56 of a fixed switch element between them in close fitting engagement. To this end, the normal spacing between the legs of each U-shaped portion 58 is preferably slightly less than the thickness of the contact portion 56 so that when the portion 56 is received between the legs of the portion 58, these legs are resiliently spread apart so that the contact portion 56 is firmly pressed between them. The plate 50 is provided with a blank portion 60 which is adjacent to the bridging conductor 57 and which moves between the contact portion 56 of the fixed elements when the bridging conductor is moved out of contact therewith, so that the plate 50 acts as a barrier to prevent arcing from one fixed element 54 to the other when the circuit is ruptured. If desired, a suitable pin 61 of insulating material may be fixed in the plate 50 rearwardly of the blank space 60 to engage the inwardly extending portions of the fixed switch elements and thus to limit the outward movement of the plate 50. The forward end of the plate may be provided with a convenient aperture 62 to facilitate grasping the outer end of the plate when it is desired to open the corresponding switch units. As shown in Figure 3, the outer end of the plate 50 is just behind the plane of the box cover when the switch is closed. When the plate 50 is pulled outwardly to open the switch, its outer end projects beyond the plane of the box cover so that if the cover is swung shut while either or both of the load switch units are open, the cover engages the outer ends of the projecting plates 50 as it is closing and pushes these plates rearwardly so as to close their respective switch units. Thus, if an operator neglects to remove the temporary connections made in the box during the testing of a meter, and closes the box without previously closing the load switches, the closing of the box automatically closes the switches and thus relieves the temporary connections of the full load current.

If desired, the pins 61 which limit the outward movement of the plate 50 may be omitted so that the plate may be completely removed. This feature is convenient in cases where service is temporarily discontinued since it is easy to remove the plates 50 and leave them out of the box when the box is closed.

The structure carried by the plates 22 or 50 to contact with and to clamp the complemental free end portions 24 or 56 of the fixed contact members, may be mounted on the plates in any suitable manner, as for example in an aperture formed in the plate, so that the portions which actually engage the fixed contact members may have contacting surfaces maintained in substantial parallelism with the faces of the plate but in such positions as to receive the free end portions of the fixed contact members. For convenience in manufacture, the parts of the contacting and clamping structure carried by the plate are separately formed and are then assembled in or on the plate, suitable means being employed to hold them in position, so that portions of the clamping structure will project out beyond the faces of the plate to receive and engage the free contact portions of corresponding fixed contact members. If, for example, the bridging conductor is supplied in the shape of a W, this may be separately fashioned from strip stock and subsequently mounted in place in an aperture in the plate. One way of doing this is as follows. Through this plate I cut a narrow transverse slot wide enough to receive a strip of bar stock such as is used in making a bridging conductor 26. One side edge of the plate 22 may then be notched as at 70, this notch being longitudinally offset from the slot. The plate 22 is then drilled with a couple of holes 71 which extend transversely from the bottom of the notch 70 toward the opposite side edge of the plate. A block 72 is then stamped from the central portion of the plate 22, this block adjoining the previously cut slot and having a width preferably equal to the length of the slot. The block is of sufficient length to include both of the holes 71. A bridging conductor 26 which may have been previously bent to shape is then mounted on the block 72 to straddle one end edge thereof and to engage both broad faces thereof as shown at Figure 8. The block and bridging conductor as thus assembled are moved into position in the hole 73 so that the segments of the holes 71 are aligned, the broad faces of the block 72 then being flush with the broad faces of the plate 22. The block is then secured in position by thrusting the legs of a U-shaped staple 74 into the holes 71, the base portion of the staple 74 being received in the notch 70. This method of constructing a movable switch member is advantageous in that the bridging conductor is more easily and accurately bent to shape before being passed through the plate 22, and the parts are easily and quickly assembled.

Figure 10 illustrates a wiring plan for which the switch is particularly suited. The line wires 80 and 81 are connected respectively with line terminals and switch units supported by the block 10. The load wires 82 and 83 are connected respectively with terminals of the load switch units carried by the block 19. The opposite terminals on these switch units are suitably connected as by wires 84, 85, 86 and 87 through the field coils of the meter, the line switch units terminals being also connected by wires 88, 89 through the potential winding of the meter. The intermediate line wire 90 and load line 91 are grounded as at 92.

Figure 11 illustrates a wiring diagram for a fused service switch embodying the invention. As shown, each of the fuses 95 is connected to a pair of switch elements 22. All these elements may, if desired, be connected to an operating shaft 32 for simultaneous operation. When the switch is open, every fuse is disconnected from all sources of potential at both ends so that it can be safely handled.

It is obvious that many modifications and changes may be made in the specific embodiment of the invention hereinbefore described and illustrated on the drawings without departing from the spirit and scope of the invention as defined in the following claims.

I claim:—

1. An electrical switch comprising a box with a back and a hinged front cover, and a switch united mounted within said box so as to be accessible for operation only when the box is open, said unit including a member manually movable away from the back of the box to open its switch, said member being engageable when in its extreme open-switch position by the box cover and movable therefrom by the closing movement of the cover to its closed-switch position.

2. An electrical switch comprising a pair of spaced fixed contact elements, a barrier of insulating material slidable between said fixed elements, and a pair of connected switch elements carried by said barrier and movable therewith into and out of engagement with said fixed elements, the elements of one said pair being U-shaped, the elements of the other said pair being flat to engage snugly between the legs of the respective U-shaped elements.

3. An electrical switch comprising an insulating base having an aperture therein, a barrier plate slidable within said aperture, a pair of connected contact elements carried by said plate and movable therewith, and a pair of fixed contact elements mounted on said base and engageable respectively by said movable elements, the elements of one said pair each including a flat strip of conducting material bent to U-shape, the elements of the other pair including portions of flat conducting material adapted to engage snugly between the legs of the respective U-shaped elements.

4. A self-aligning electrical switch comprising a base of insulating material having an aperture therein, a pair of fixed contact elements mounted on opposite sides of said aperture, said elements each including a strip of flat metal stock supported clear, said strips being parallel and presenting flat faces to each other, an insulating barrier plate loosely slidable between said flat faces, and a bridging conductor carried by said plate, said bridging conductor including a U-shaped portion on each side of the plate movable therewith to engage both faces of one of said strips, whereby the interengaging portions of said contact elements and bridging conductor are properly aligned when in closed-switch position.

5. An electrical switch comprising an insulating base with a hole therethrough, a pair of fixed switch elements mounted on said base with contact portions projecting into said hole, each said contact portion being spaced from the sides of the hole and from the other contact portion, a barrier of insulating material slidable in said hole between said contact portions, and a bridging conductor mounted on said barrier, said conductor having a W-shape including a U-shaped portion against each side face of the barrier, each said U-shaped portion being shaped and arranged to receive the contact portion of one of said fixed elements in close-fitting engagement.

6. An electrical switch comprising a box having a back and a hinged front cover, a plurality of pairs of switch contacts mounted within said box, an insulating barrier slidable between each pair of contacts, and a bridging conductor carried by each said barrier and movable therewith to connect and disconnect its corresponding pair of contacts, said barriers being movable perpendicularly to the plane of the back of the box and away from the back of the box to open-switch position and being engageable by the box cover when in said open-switch position and movable by said cover back to closed-switch position when the cover is swung to its closed position.

7. In an electrical switch, a plate of insulating material having a blank portion, a bridging conductor extending through the plate and bending on each side of the plate away from said blank portion and back toward said blank portion, the conductor as a whole being W-shaped.

8. In an electrical switch, a plate of insulating material having an aperture therethrough, a block removably mounted in said aperture, and a bridging conductor having portions offset from and substantially parallel to the respective side faces of said plate, said bridging conductor being removable as a unit with said block from said aperture.

9. In an electrical switch, a plate of insulating material having a blank portion and an aperture adjacent thereto, a block removably mounted in said aperture, and a bridging conductor straddling said block and removable as a unit therewith, said conductor having a U-shaped portion on each side of said block opening toward the blank portion of the plate.

10. In an electrical switch, a plate of insulating material having an aperture therethrough, self-aligning means mounted in said aperture and projecting beyond both faces of said plate to receive contact members, said projecting means including jaws disposed on each side of the plate to press resiliently on both opposite faces of the contact members received thereby, said means also including a conductor electrically connecting the contact members when received in said jaws.

11. An electrical switch comprising a box having a back and a hinged front cover, a base of insulating material mounted within said box, said base having a plurality of holes therethrough from front to back, a pair of fixed switch elements mounted on opposite sides of each hole and extending thereinto, an insulating barrier slidable in each hole toward and from the back of the box, a bridging conductor carried by said barrier and movable therewith into and out of contact with the corresponding pairs of fixed switch elements, said barriers being inaccessible when the box is closed and manually movable away from the back of the box to open-switch position when the box is open, said barriers also being engageable by the box cover, when in open-switch position, and movable thereby to closed-switch position.

12. Apparatus of the class described, comprising a box with a hinged cover, an insulating block mounted within said box and having a hole therethrough, a pair of contact elements on opposite sides of said hole, an insulating barrier extending through said hole, a bridging conductor carried by said barrier and movable therewith in a direction toward the box cover to an open-switch position, said contact elements and bridging conductor being shaped to cooperate for mutual self alinement when the barrier is in closed-switch position, the outer end of said barrier being engageable by the box cover when in open-switch position and movable by box-closing movement of said cover to closed-switch position.

13. An electrical switch comprising in combination an insulating base structure having two portions of substantially identical construction, each portion having means thereon adapted for controlling the movement of a circuit making and breaking member, two pairs of opposed contacts mounted in identical positions on the respective portions of the base structure, an operating member supported separately from the base structure, a switching member engaging the controlling means on one portion of the base structure and connected with the operating member to be moved into and out of circuit making position between the corresponding contacts, and a circuit making and breaking member engaging the controlling means on the other portion of the base structure and manually movable independently of the operating member into and out of circuit making position between the corresponding contacts.

ERNEST G. JOHANSSON.